US012748978B2

(12) United States Patent
Lee et al.

(10) Patent No.: US 12,748,978 B2
(45) Date of Patent: Sep. 29, 2026

(54) EARLY STOPPING METHOD FOR NEURAL NETWORK USING UNLABELED DATA

(71) Applicant: GIST (Gwangju Institute of Science and Technology), Gwangju (KR)

(72) Inventors: Hyunju Lee, Gwangju (KR); HongSeok Choi, Gwangju (KR); Dongha Choi, Gwangju (KR)

(73) Assignee: GIST (Gwangju Institute of Science and Technology), Gwangju (KR)

( * ) Notice: Subject to any disclaimer, the term of this patent is extended or adjusted under 35 U.S.C. 154(b) by 706 days.

(21) Appl. No.: 18/161,461

(22) Filed: Jan. 30, 2023

(65) Prior Publication Data

US 2024/0013060 A1 Jan. 11, 2024

(30) Foreign Application Priority Data

Jul. 5, 2022 (KR) ........................ 10-2022-0082728

(51) Int. Cl.
*G06N 3/09* (2023.01)

(52) U.S. Cl.
CPC ..................................... *G06N 3/09* (2023.01)

(58) Field of Classification Search
None
See application file for complete search history.

(56) References Cited

U.S. PATENT DOCUMENTS

| | | | | |
|---|---|---|---|---|
| 7,778,803 | B1 * | 8/2010 | Bax | G06F 17/17 703/2 |
| 2019/0114544 | A1 * | 4/2019 | Sundaram | G06N 7/01 |
| 2022/0335296 | A1 * | 10/2022 | Baker | G06N 3/084 |

FOREIGN PATENT DOCUMENTS

WO WO-2018226527 A1 * 12/2018 ............... G06N 3/08

OTHER PUBLICATIONS

HongSeok Choi et al.; "Early Stopping Based on Unlabeled Samples in Text Classification"; In Proceedings of the 60th Annual Meeting of the Association for Computational Linguistics; vol. 1: Long Papers; Association for Computational Linguistics; Dublin, Ireland; May 22-27, 2022; pp. 708-718.

* cited by examiner

*Primary Examiner* — Kakali Chaki
*Assistant Examiner* — Tyler Edward Iles
(74) *Attorney, Agent, or Firm* — Studebaker Brackett PLLC

(57) ABSTRACT

An early stopping method for a neural network according to an embodiment of the present disclosure includes: dividing a labeled dataset into a training dataset and a validation dataset; creating a pretrained neural network by training a neural network using the training dataset and early stopping learning of the neural network using the validation dataset; and creating a target neural network for each epoch by training the target neural network using the entire labeled dataset, and early stopping learning of the target neural network on the basis of a similarity between output of the pretrained neural network on at least one of the labeled data and unlabeled data and output of the target neural network on the unlabeled data.

9 Claims, 12 Drawing Sheets

EARLY STOPPING METHOD FOR NEURAL NETWORK USING UNLABELED DATA

CROSS REFERENCE TO RELATED APPLICATION

The present application claims priority to Korean Patent Application No. 10-2022-0082728, filed Jul. 5, 2022, the entire contents of which is incorporated herein for all purposes by this reference.

BACKGROUND OF THE INVENTION

Field of the Invention

The present disclosure relates to a method of determining an early stopping point in time of classification neural network learning using unlabeled data.

Description of the Related Art

A neural network is supervised-trained by a previously labeled training dataset, and when the number of times of training exceeds a certain number of times, the neural network is overfitted to the training dataset, so a problem that performance on a test dataset decreases is generated. A user has to stop learning of the neural network at an appropriate point in time in consideration of this problem, which is called early stopping.

In detail, referring to FIG. 1, as learning of a neural network is repeated, an error of the neural network on a training dataset decreases, but when learning is performed over a certain number of times, the performance of the neural network is overfitted only to the training data, so the error of the neural network on an actual test dataset increases.

Referring to FIGS. 2 and 3, in order to solve the problems described above, a user divides an entire labeled dataset (hereafter, labeled dataset) into a training dataset and a validation dataset, checks the performance of a neural network using the validation dataset while repeating training using the training dataset, and determines a point at which an error on the validation dataset is minimum as an early stopping point in time.

However, when an early stopping point in time is determined in this way, it is required to allocate a portion of a labeled dataset as the validation dataset, so there is a problem that the amount of a training dataset that is used in actual training decreases. This problem is more fatal when a neural network is trained for tasks that have difficulty in securing a large amount of labeled dataset, for example, a task of classifying medical images.

SUMMARY OF THE INVENTION

An objective of the present disclosure is to determine an early stopping point in time of neural network learning using a great amount of unlabeled data in addition to a small amount of labeled data.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

In order to achieve the objectives described above, an early stopping method for a neural network according to an embodiment of the present disclosure includes: dividing a labeled dataset into a training dataset and a validation dataset; creating a pretrained neural network by training the pretrained neural network using the training dataset and early stopping learning of the pretrained neural network using the validation dataset; and creating a target neural network for each epoch by training the target neural network using the entire labeled dataset, and early stopping learning of the target neural network on the basis of a similarity between output of the pretrained neural network on at least one of the labeled data and unlabeled data and output of the target neural network on the unlabeled data.

In an embodiment, the early stopping includes early stopping learning of the target neural network at an epoch at which the similarity between the outputs of the pretrained neural network and the target neural network is the maximum.

In an embodiment, the early stopping includes early stopping learning of the target neural network on the basis of a similarity between a sample confidence of the pretrained neural network on the labeled dataset and a sample confidence of the target neural network on the unlabeled dataset.

In an embodiment, the early stopping includes: creating a first confidence graph by arranging sample confidences of the pretrained neural network in order of magnitude; creating a second confidence graph by arranging sample confidences of the target neural network in order of magnitude; and early stopping learning of the target neural network on the basis of a similarity between the first and second confidence graphs.

In an embodiment, the early stopping includes: sampling the second confidence graph such that the numbers of samples corresponding to the first and second confidence graphs become the same; and early stopping learning of the target neural network on the basis of a similarity between the first confidence graph and the sampled second confidence graph.

In an embodiment, the early stopping includes early stopping learning of the target neural network on the basis of a similarity between prediction class distributions of the pretrained neural network and the target neural network on unlabeled data.

In an embodiment, the early stopping includes: calibrating the prediction class distribution of the pretrained neural network on the unlabeled data on the basis of the prediction class distribution of the pretrained neural network on the validation dataset or an actual class distribution of the labeled dataset and accuracy of the pretrained neural network on the validation dataset; and early stopping learning of the target neural network on the basis of the similarity between the calibrated prediction class distribution of the pretrained neural network and the prediction class distribution of the target neural network.

In an embodiment, the calibrating includes calibrating the prediction class distribution of the pretrained neural network on the unlabeled data in accordance with the following [Equation 1], $$C_u' = B + \frac{(1 - 1/n_c)}{(Acc_{val} - 1/n_c)}(C_u - B) \quad \text{[Equation 1]}$$

(where $C_u'$ is a calibrated prediction class distribution, B is the prediction class distribution of the pretrained neural network on the validation dataset or the actual class distribution of the labeled dataset, $Acc_{val}$ is the accuracy of the pretrained neural network on the validation dataset, $n_c$ is the number of classes, and $C_u$ is the prediction class distribution of the pretrained neural network on the unlabeled data).

In an embodiment, the early stopping includes early stopping learning of the target neural network on the basis of a first similarity between a sample confidence of the pretrained neural network on the labeled dataset and a sample confidence of the target neural network on unlabeled data and a second similarity between prediction class distributions of the pretrained neural network and the target neural network on the unlabeled data.

In an embodiment, the early stopping includes further training the target neural network by preset epochs including an epoch at which the first similarity is the maximum, and early stopping learning of the target neural network at an epoch at which the second similarity is the maximum of the preset epochs.

According to the present disclosure, it is possible to train a neural network using the entire labeled dataset without allocating a portion of the labeled dataset as a validation dataset, so it is possible to improve the performance of the neural network.

Further, according to the present disclosure, an ideal early stopping point in time of learning of a neural network is determined using a great amount of unlabeled data, so it is very useful for learning of a neural network particularly for tasks with a small amount of labeled dataset.

Detailed effects of the present disclosure in addition to the above effects will be described with the following detailed description for accomplishing the present disclosure.

BRIEF DESCRIPTION OF THE DRAWINGS

The accompanying drawings of this specification exemplify preferred embodiments and help easy understanding of the present invention together with the following detailed description, so the present invention should not be construed as being limited to the drawings.

DETAILED DESCRIPTION OF THE INVENTION

Figure 1:
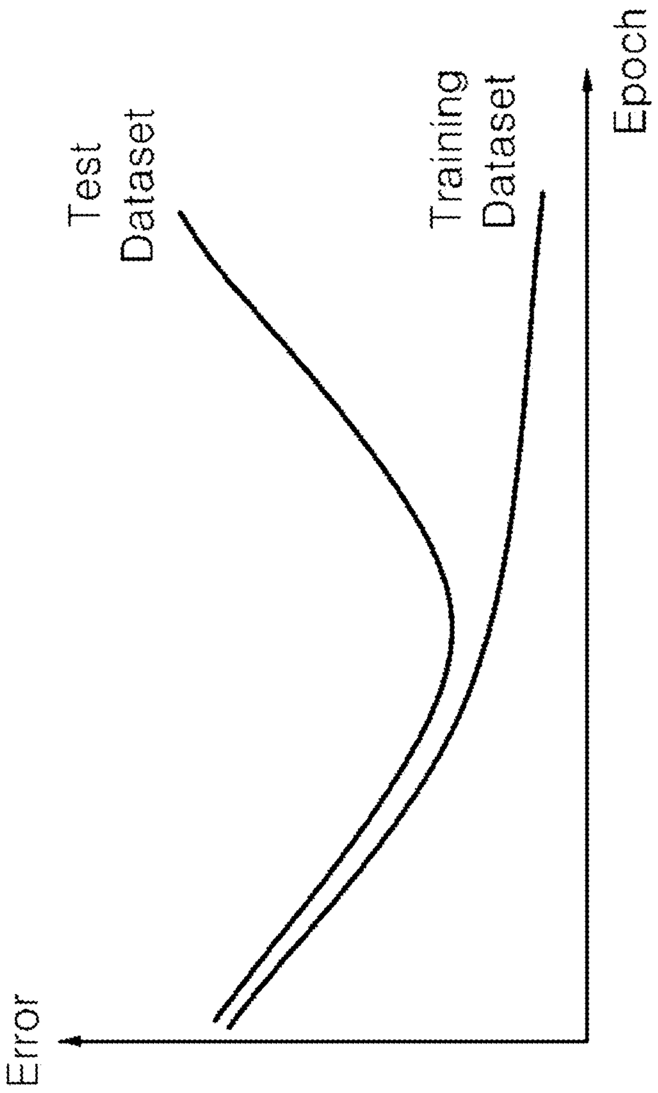
FIG. 1 is a graph showing an error of a neural network according to learning epochs.

The objects, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present invention will be described with reference to accompanying drawings. The same reference numerals are used to indicate the same or similar components in the drawings.

Although terms 'first', 'second', etc. are used to describe various components in the specification, it should be noted that these components are not limited by the terms. These terms are used to discriminate one component from another component and it is apparent that a first component may be a second component unless specifically stated otherwise.

Further, when a certain configuration is disposed "over (or under)" or "on (beneath)" of a component in the specification, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component in the specification, it should be understood that the components may be directly connected or jointed to each other, but another component may be "interposed" between the components or the components may be "connected", "coupled", or "jointed" through another component.

Further, singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

The present disclosure relates to a method of determining an early stopping point in time of classification neural network learning using unlabeled data. Hereafter, a method of early stopping neural network learning according to an embodiment of the present disclosure is described in detail with reference to FIGS. 1 to 12.

FIG. 1 is a graph showing an error of a neural network according to learning epochs.

Figure 2:
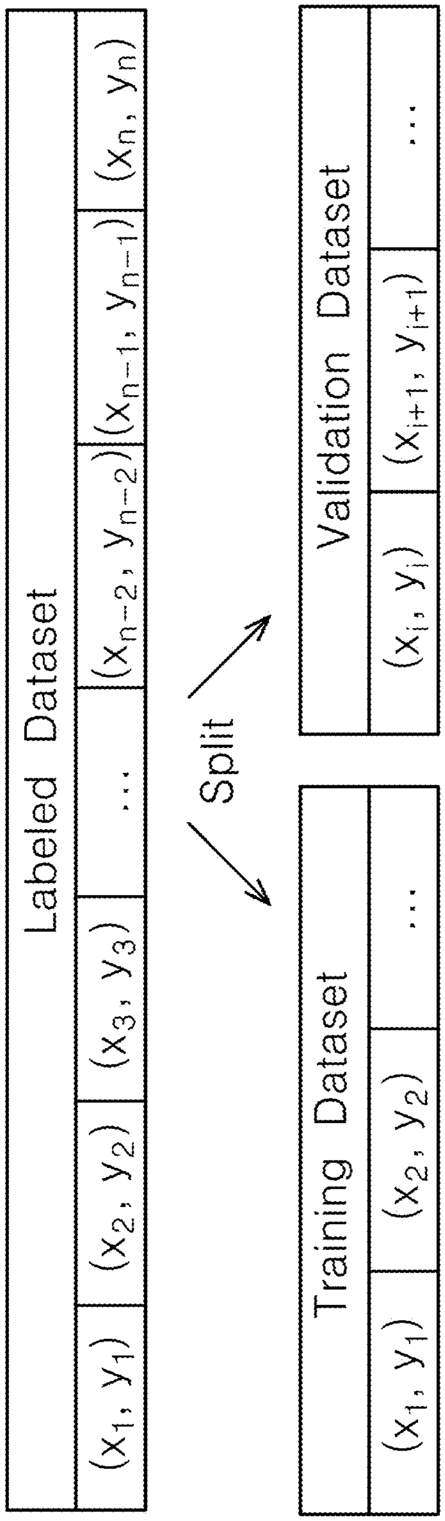
FIG. 2 is a diagram showing that a portion of a labeled dataset is divided into a validation dataset to determine an early stopping point in time of neural network learning.
Figure 3:
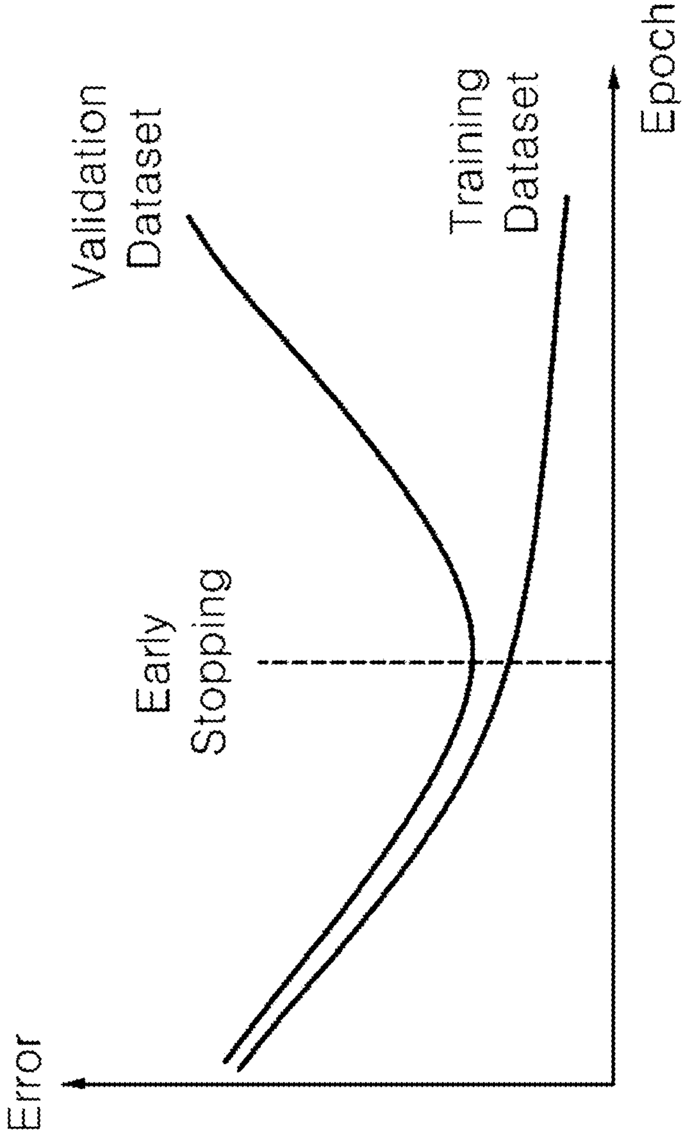
FIG. 3 is a graph showing a point at which a neural network error on a validation dataset is minimum as an early stopping point in time.

FIG. 2 is a diagram showing that a portion of a labeled dataset is divided into a validation dataset to determine an early stopping point in time of neural network learning and FIG. 3 is a graph showing a point at which a neural network error on a validation dataset is the minimum as an early stopping point in time.

Figure 4:
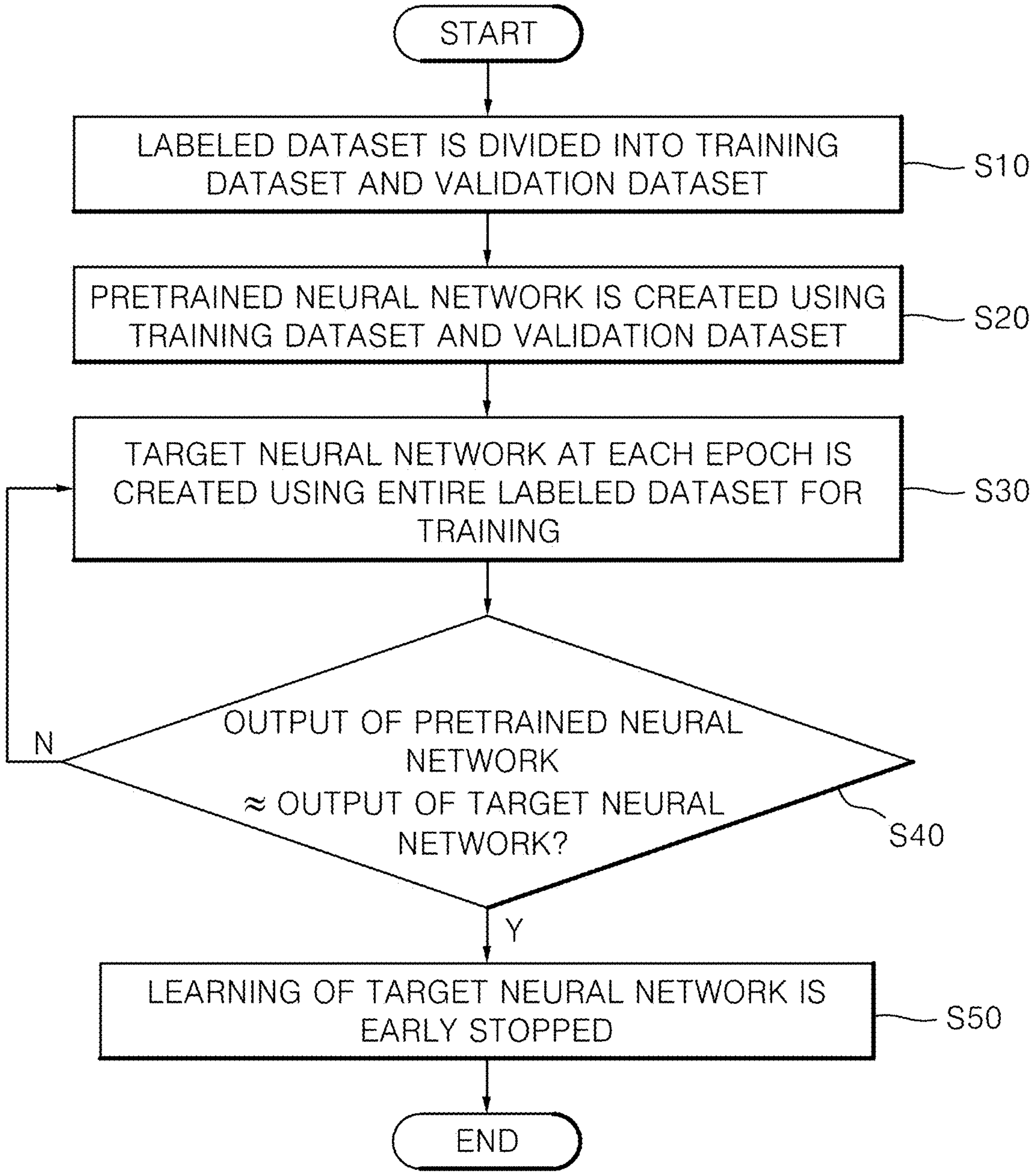
FIG. 4 is a flowchart showing an early stopping method for a neural network according to an embodiment of the present disclosure.

FIG. 4 is a flowchart showing an early stopping method for a neural network according to an embodiment of the present disclosure.

Figure 5:
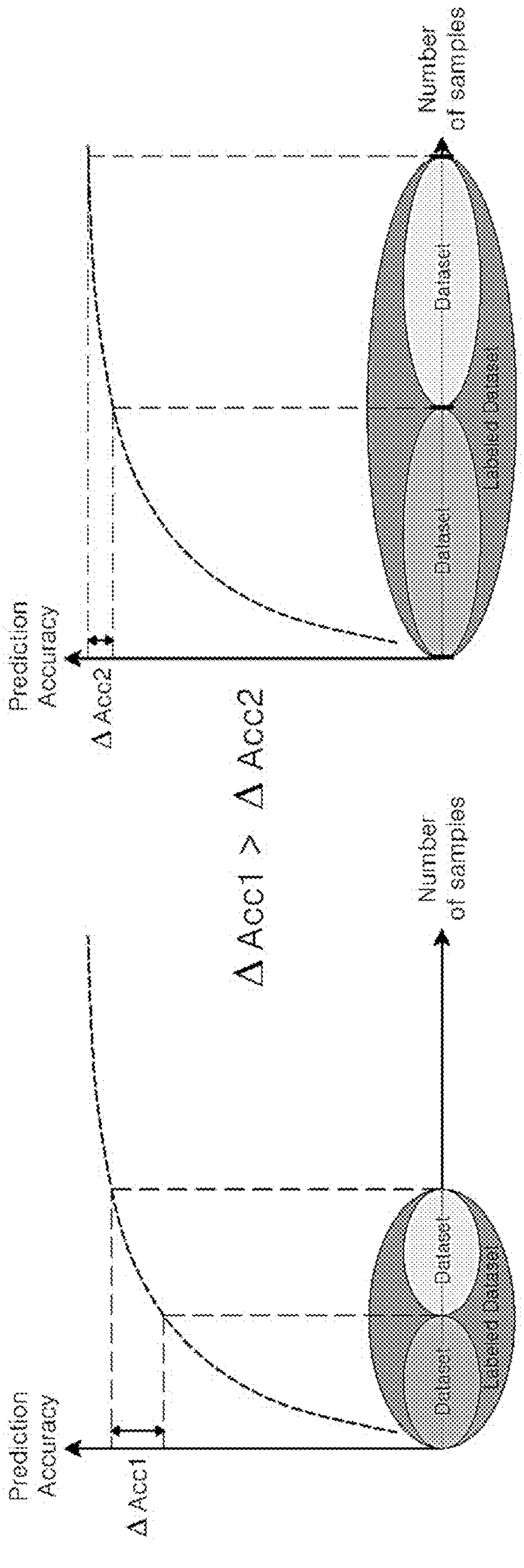
FIG. 5 is a graph showing a difference of the accuracy of a neural network according to the number of entire labeled data.
Figure 6:
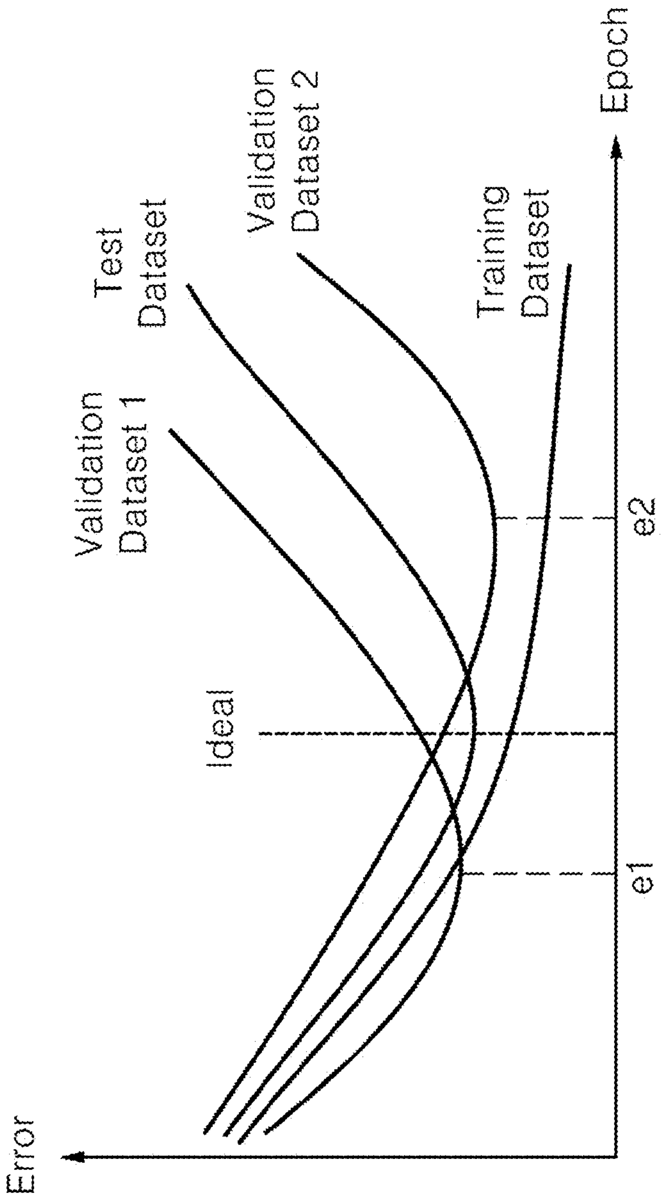
FIG. 6 is a graph for illustrating limitation of early stopping based on validation data.

FIG. 5 is a graph showing a difference of the accuracy of a neural network according to the number of entire labeled data and FIG. 6 is a graph for illustrating limitation of early stopping based on validation data.

Figure 7:
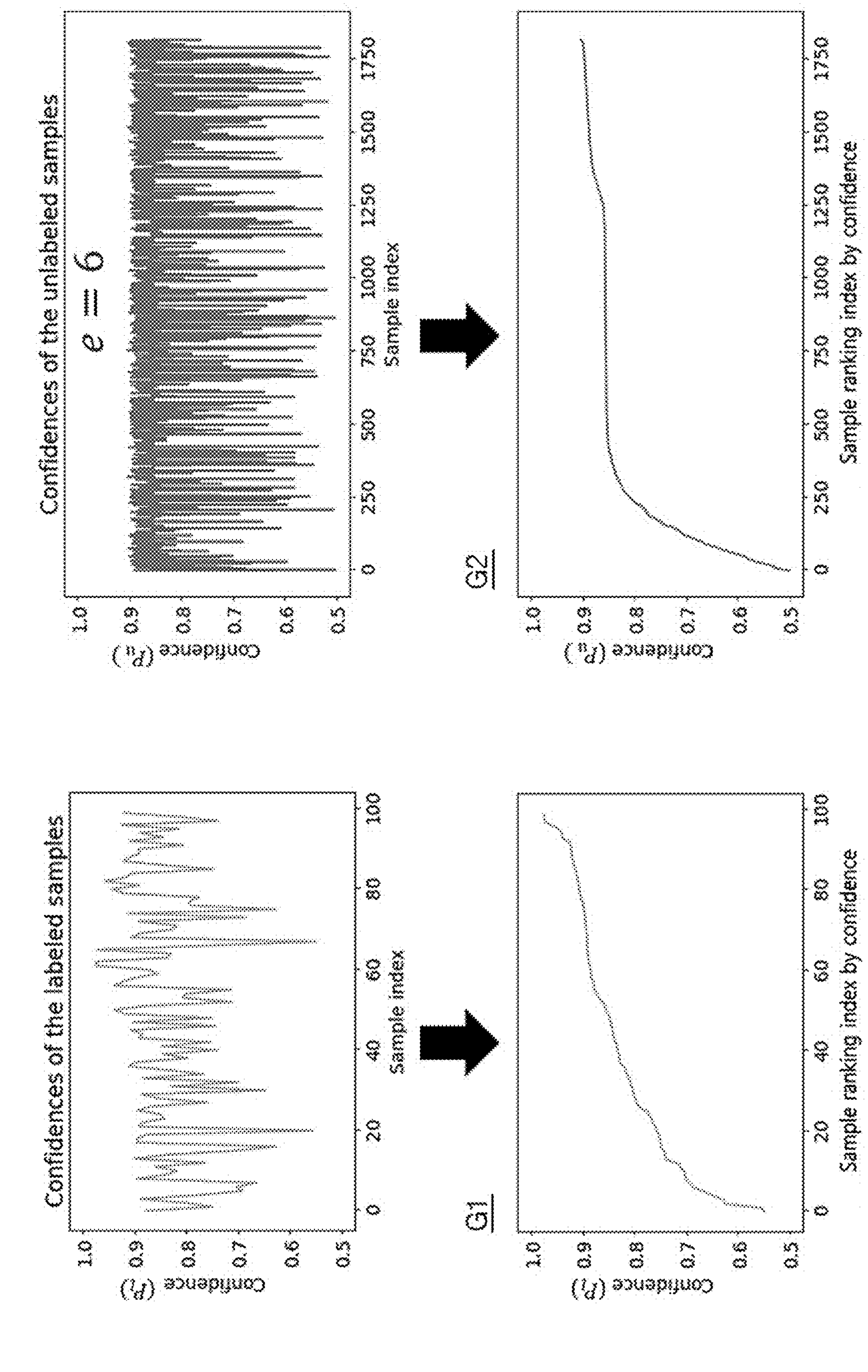
FIGS. 7 and 8 are diagrams showing a process of processing sample confidences of each neural network to calculate the output similarity of a pretrained neural network and a target neural network.
Figure 8:
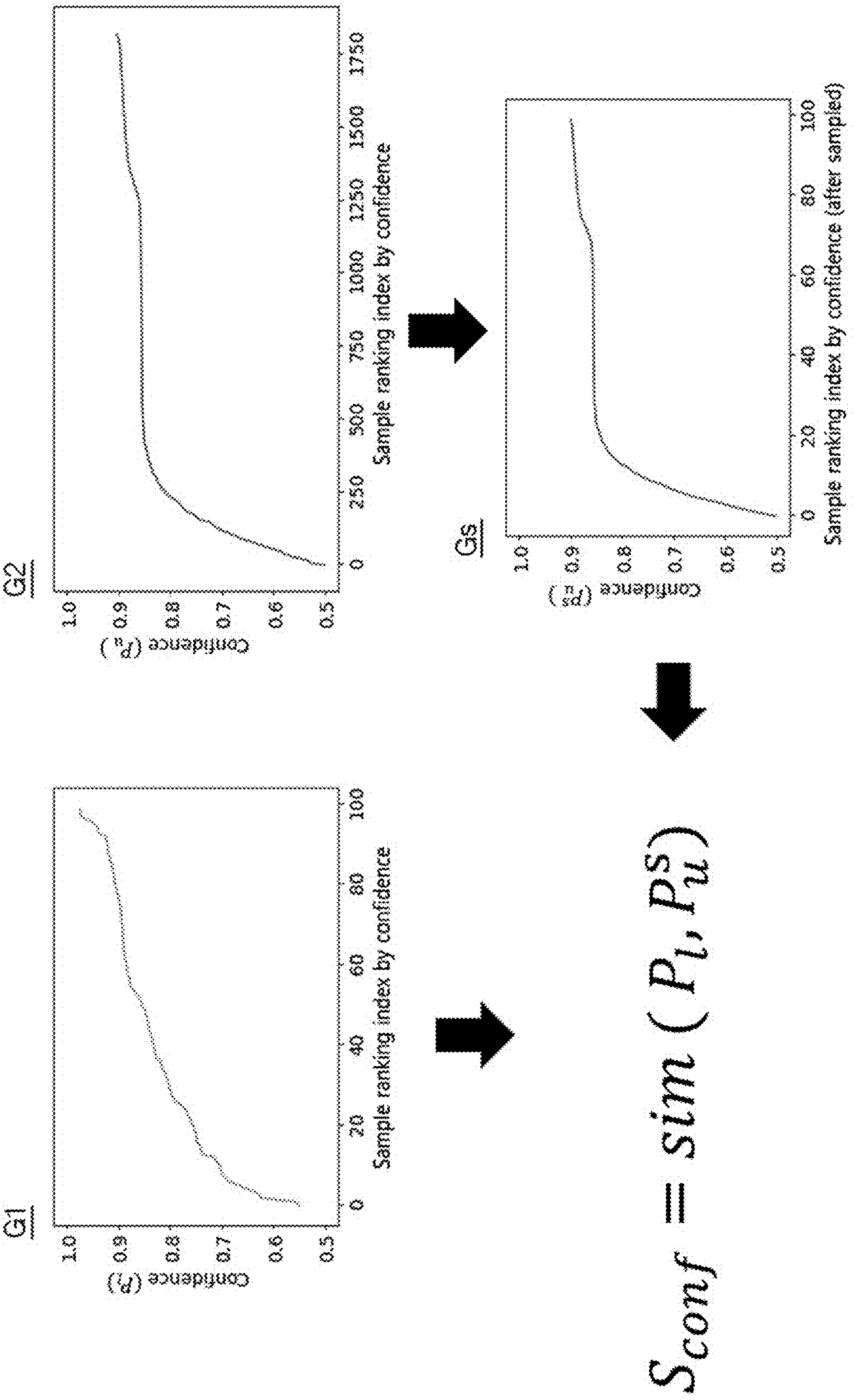
Figure 9:
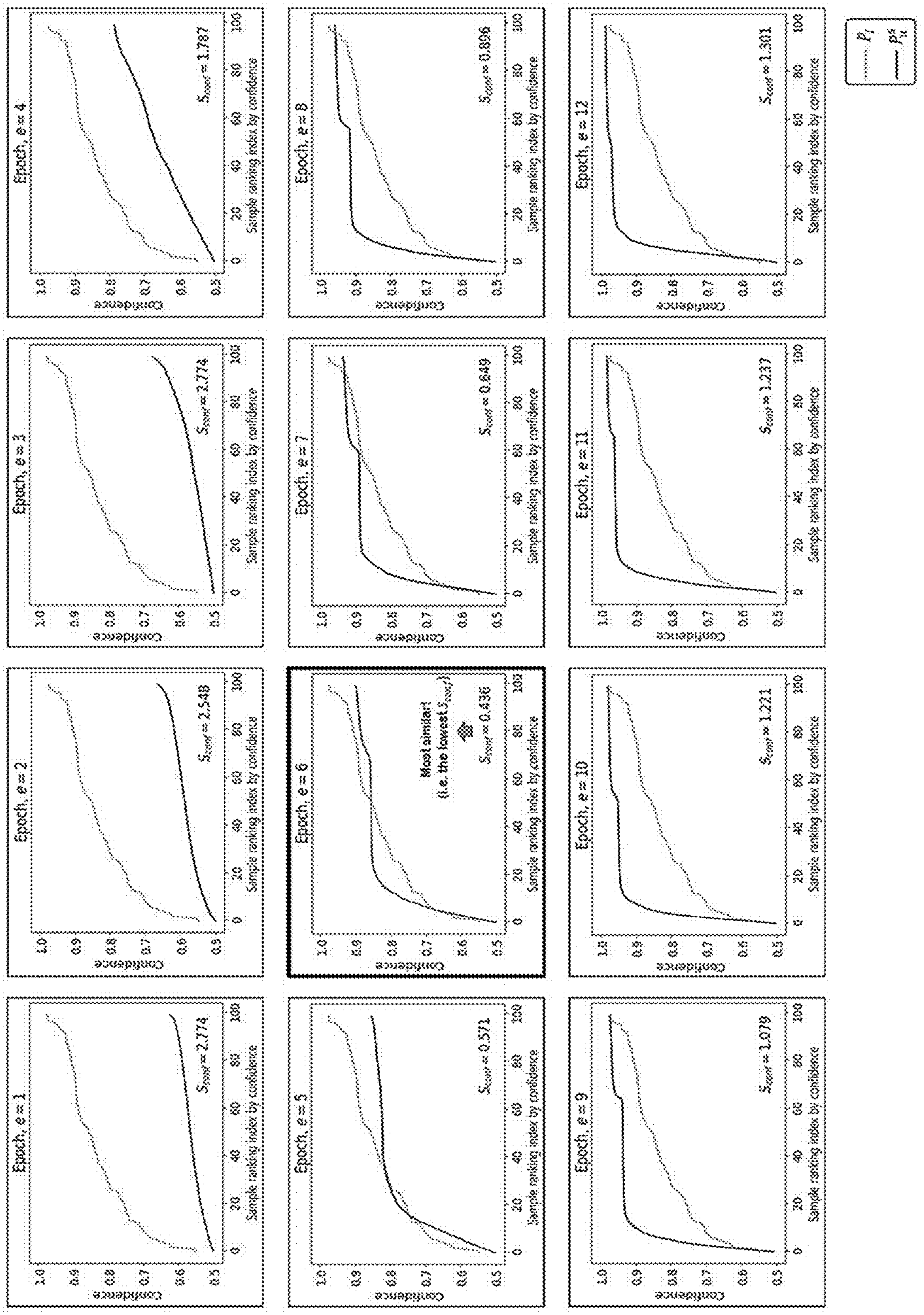
FIG. 9 is a diagram illustrating a process of determining an early stopping point in time in accordance with a similarity of sample confidences.

FIGS. 7 and 8 are diagrams showing a process of processing sample confidences of each neural network to calculate the output similarity of a pretrained neural network and a target neural network. FIG. 9 is a diagram illustrating a process of determining an early stopping point in time in accordance with a similarity of sample confidences.

Figure 10:
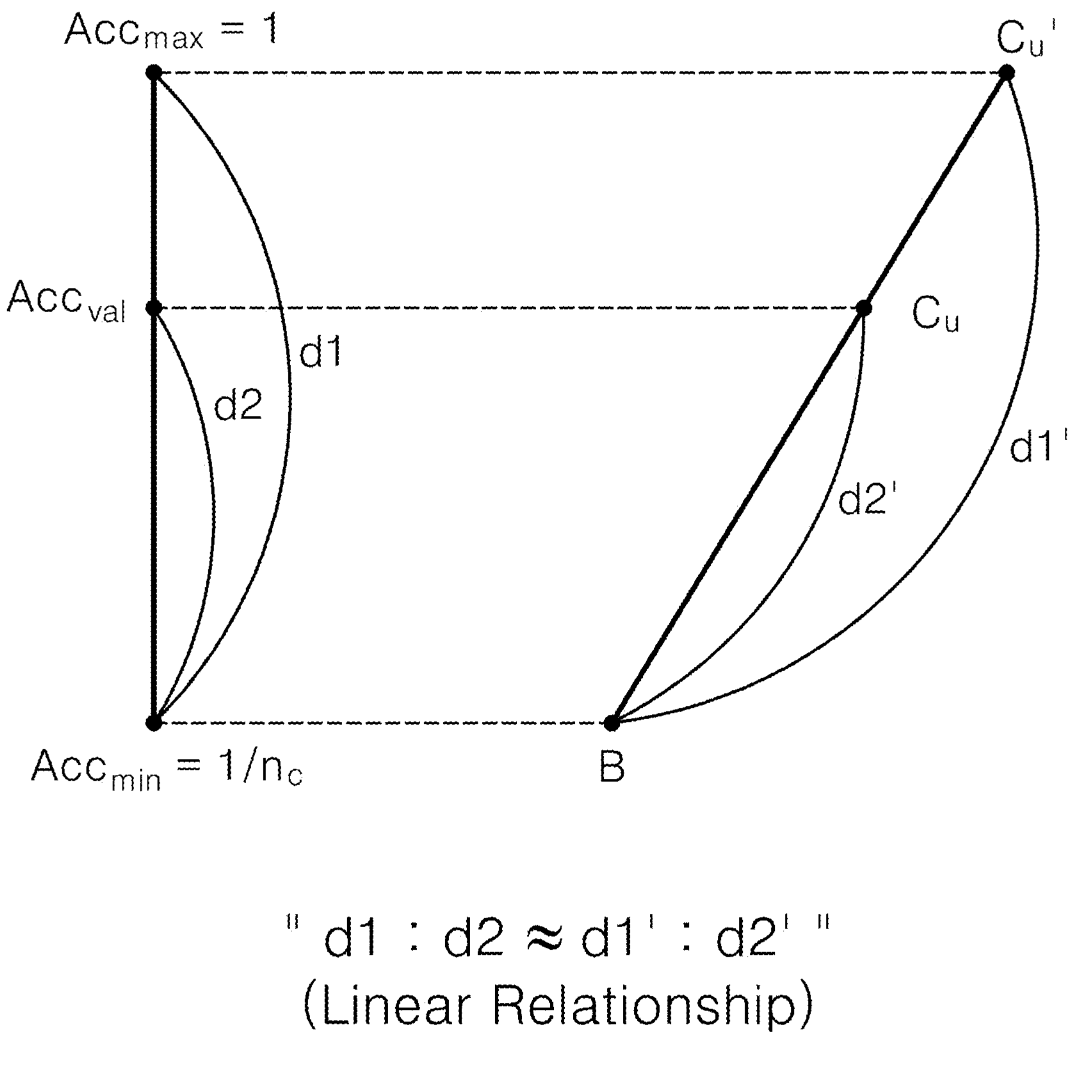
FIGS. 10 and 11 are diagrams illustrating a process of calibrating a prediction class distribution of a pretrained neural network.
Figure 11:
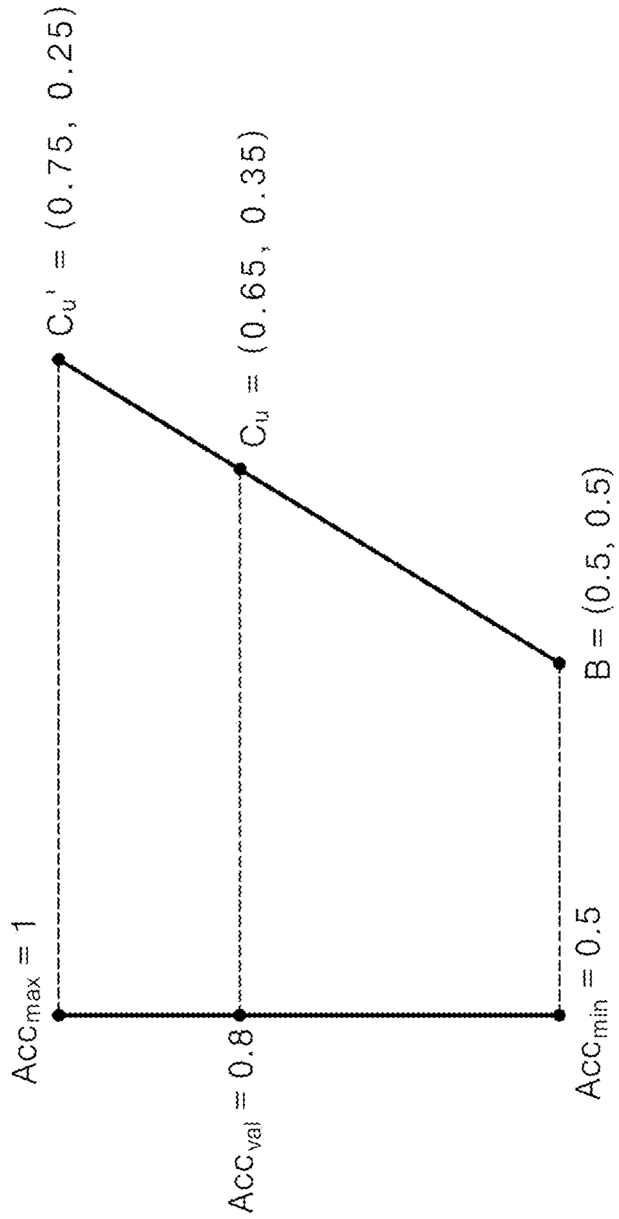

FIGS. 10 and 11 are diagrams illustrating a process of calibrating a prediction class distribution of a pretrained neural network.

Figure 12:
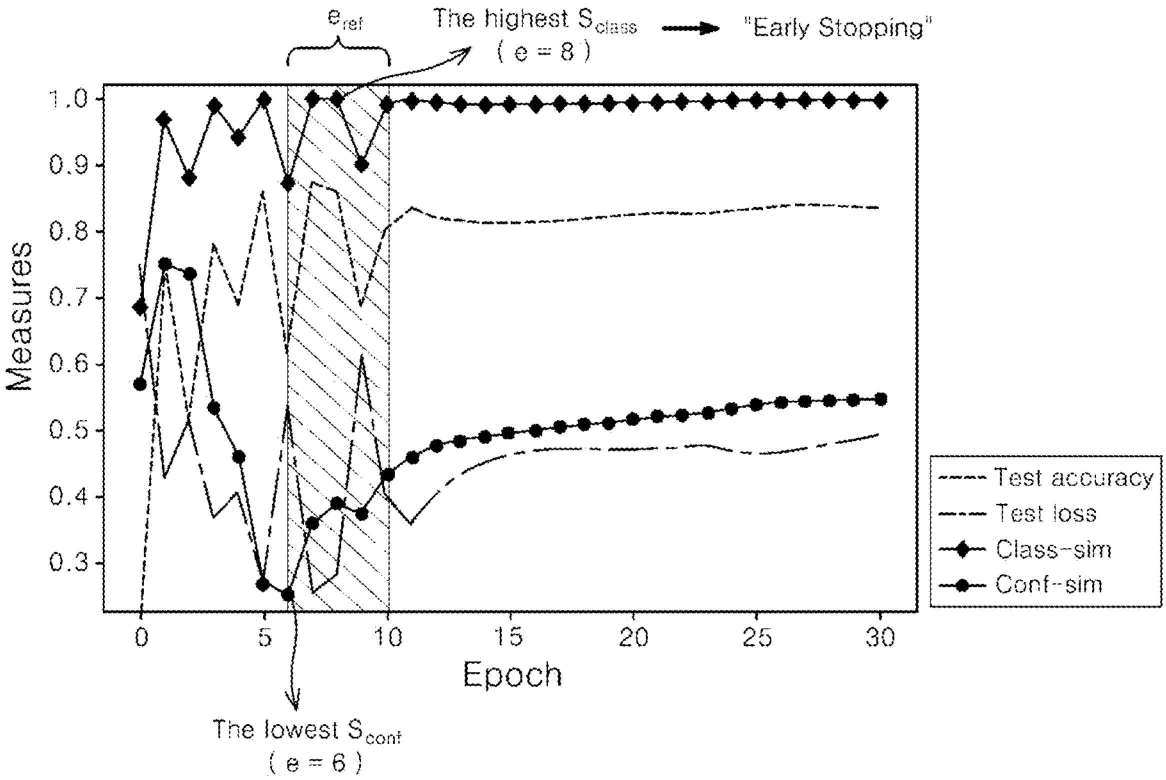
FIG. 12 is a graph illustrating a process of determining an early stopping point in time in accordance with respective similarities between sample confidences and between prediction class distributions of a pretrained neural network and a target neural network.

FIG. 12 is a graph illustrating a process of determining an early stopping point in time in accordance with respective similarities between sample confidences and between prediction class distributions of a pretrained neural network and a target neural network.

Referring to FIG. 4, an early stopping method for neural network according to an embodiment of the present disclosure may include: dividing a labeled dataset into a training dataset and a validation dataset (S10); creating a pretrained neural network using the training dataset and the validation dataset (S20); creating a target neural network for each epoch using the entire labeled dataset for training (S30); calculating similarities between output of the pretrained neural network and output of the target neural network (S40); and early stopping learning of the target neural network on the basis of the similarity.

However, early stopping method for neural network shown in FIG. 4 is based on an embodiment, the steps of the present disclosure are not limited to the embodiment shown in FIG. 4, and if necessary, some steps may be added, changed, or removed.

The steps shown in FIG. 4 may be performed by a processor such as a central processing unit (CPU), a graphics processing unit (GPU), etc., and the processor, in order to perform operations to be described below, may include at least one physical element of application specific integrated circuits (ASICs), digital signal processors (DSPs), digital signal processing devices (DSPDs), programmable logic devices (PLDs), field programmable gate arrays (FPGAs), a controller, and micro-controllers.

Hereafter, the steps shown in FIG. 4 are described in detail.

A processor can divide a labeled dataset into a training dataset and a validation dataset (S10). In this case, the labeled dataset, which is data labeled in advance by a user for supervised learning of a neural network, may be composed of input data and a corresponding classes when a neural network performs a classification task.

Referring to FIG. 2, in detail, the labeled dataset may be composed of input data ($x_1, x_2, \ldots, x_n$) and classes ($y_1, y_2, \ldots, y_n$) corresponding to the input data, respectively. For example, input data (x) when the neural network performs emotion classification task of a text may be a text such as "This is a good script, good dialogue, funny even for adults." and a corresponding class (y) may be "Positive". Further, the input data (x) may be a text such as "The crisis had a bad effect on trade." and a corresponding class (y) may be "Negative".

The processor can divide the labeled dataset, as shown in FIG. 2, into a training dataset (($x_1$, $y_1$), ($x_2$, $y_2$) . . . ), and a validation dataset (($x_i$, $y_i$), ($x_{i+1}$, $y_{i+1}$), . . . ). In this case, the number of data included in the training dataset and the validation dataset, for example, may have a ratio of about 5:5 to 8:2.

Hereafter, for the convenience of description, the labeled dataset can be denoted as (x, y), the training dataset as ($x_t$, $y_t$), and the unlabeled dataset as ($x_u$, $y_u$).

The processor can train the neural network using the training dataset and can early stop learning of the neural network using the validation dataset, thereby being able to create pretrained neural network (S20).

When an initialized neural network is prepared, the processor can supervised-train the neural network by setting input/output of the neural network on the basis of training dataset. In detail, the processor can train a neural network by setting data that are input to the neural network as $x_t$ and data that are output from the neural network as $y_t$.

As such supervised training is repeatedly performed, the neural network can learn the correlation of input/output data ($x_t$, $y_t$), and when a certain $x_t$ is input to the neural network, parameters (weight and bias) of the neural network can be updated such that a corresponding class, that is, $y_t$ is output.

However, as described above with reference to FIG. 1, when the number of times of learning exceeds a certain number of times, the neural network is overfitted to the training data, so a problem that performance on a test dataset decreases is generated, so the processor can early stop learning of the neural network using the validation dataset divided in step S10.

In detail, the processor calculates an error of the neural network using the validation dataset while repeating learning using the training data and early stops learning of the neural network at a point at which an error on the validation dataset is minimum, thereby being able to create a pretrained neural network. Accordingly, the parameters of the pretrained neural network may be determined as parameters updated until an early stopping point in time.

However, when an early stopping point in time is determined in accordance with the method described above, there is a problem that when the amount of a labeled dataset is small, the accuracy of the neural network rapidly drops.

Referring to FIG. 5, prediction accuracy of a neural network may increase in the type of logarithmic function in accordance with the amount of a training dataset. Under this feature, there is limitation that when the amount of a labeled dataset is large and even though a portion of the labeled dataset is used as a validation dataset, the drop of accuracy of the neural network $^{\Delta}$Acc2 is small, but when the amount of a labeled dataset is small and a portion of the labeled dataset is used as a validation dataset, the drop of accuracy of the neural network $^{\Delta}$Acc1 is very large.

Further, when an early stopping point in time is determined in accordance with the method described above, there is a problem that the difference between the performance of a neural network on a validation dataset and the performance of a neural network on a test dataset when the amount of a labeled dataset is small is large.

Referring to FIG. 6, there is a problem that when the amount of a labeled dataset is small, not only the difference between an early stopping point in time e1 determined by a first validation dataset randomly divided from a labeled dataset and an early stopping point in time e2 determined by a second validation dataset is large, but also the early stopping points in time e1 and e2 determined by the validation datasets, respectively, may have a large difference from an ideal early stopping point in time that should be determined on the basis of performance on a test dataset.

The present disclosure can use not only a pre-prepared labeled dataset, but an unlabeled dataset to determine an ideal early stopping point in time particularly when the amount of labeled dataset is small, and hereafter, an early stopping method for a neural network according to the present disclosure is described in detail.

The processor can create a target neural network for each epoch, that is, each number of times of learning by training the target neural network using the entire labeled dataset (S30). In this case, learning of the target neural network may start from a newly initialized neural network rather than the pretrained neural network created in accordance with step S20 described above.

Meanwhile, the target neural network may be a neural network having parameters that are updated by the entire labeled dataset. Accordingly, the meaning that a target neural network is created for each epoch should be understood as a meaning that parameters of a target neural network are determined for each epoch. Meanwhile, the number of unlabeled data in the present disclosure should be understood as being greatly larger than the labeled dataset.

In detail, the processor can create a target neural network using the entire labeled dataset as a training dataset without dividing the labeled dataset into a training dataset and a validation dataset. Since the supervised learning method of a neural network was described above, it is not described in detail.

When a target neural network is created for each epoch, the processor can calculate similarities between outputs of the pretrained neural network and the target neural network on input samples (S40), and can early stop learning of the target neural network on the basis of the similarity (S50). In this case, the input samples, which are data that are input to the pretrained neural network and the target neural network, may include unlabeled data and labeled data.

In an embodiment, the processor can stop learning of the target neural network on the basis of similarity between the sample confidence of the pretrained neural network on the labeled dataset and the sample confidence of the target neural network on the unlabeled data. In this case, the sample confidence may be a maximum value of the class probabilities that are output from a neural network when a sample is input to the neural network.

In detail, the processor can input x included in the labeled dataset to the pretrained neural network previously created and the pretrained neural network can output probabilities that x belongs to each class. In this case, the processor can determine the maximum value of the class probabilities as the sample confidence.

For example, when a pretrained neural network is trained to perform an animal classification task, the processor can input an image x included in a labeled dataset into the pretrained neural network and the pretrained neural network can output a probability that x belongs to each class as in the following [Table 1]

TABLE 1

| | Class | | | |
|---|---|---|---|---|
| Input (x) | Cat | Dog | Horse | Cow |
| $x_1$ | 0.91 | 0.04 | 0.03 | 0.02 |
| $x_2$ | 0.32 | 0.61 | 0.04 | 0.03 |
| $x_3$ | 0.01 | 0.09 | 0.84 | 0.06 |

In this case, the processor can recognize each sample confidence as the maximum value of the class probabilities. In detail, the processor can recognize 0.91 as the sample confidence of $x_1$, 0.61 as the sample confidence of $x_2$, and as the sample confidence of $x_3$.

Meanwhile, the processor can input unlabeled data into a target neural network at each epoch while creating the target neural network using the entire labeled dataset for training, and the target neural network can output the probabilities that the unlabeled data belong to the classes, respectively. In this case, the processor, similarly, can determine the maximum value of the class probabilities as the sample confidence.

Referring to FIG. 7, the processor can recognize the sample confidence $P_1$ of a pretrained neural network on all labeled data (e.g., 100 samples), and similarly, the processor can recognize the sample confidence $P_u$ of a target neural network on all unlabeled data (e.g., 1800 samples) at each epoch $e_n$.

The processor can early stop learning of the target neural network at the epoch at which the similarity between the sample confidence $P_1$ of the pretrained neural network and the sample confidence $P_u$ of the target neural network is the maximum. Referring to FIG. 7, the processor can determine a similarity by comparing the sample confidence $P_1$ of the pretrained neural network on 100 labeled data and the sample confidence $P_u$ of the target neural network at each epoch on 1800 unlabeled data, and can early stop learning of the target neural network at the epoch at which the similarity is the maximum.

Meanwhile, because the sample confidences $P_1$ and $P_u$ cannot show tendency representing a data set, the processor can convert the sample confidences $P_1$ and $P_u$ into graph data having tendency to facilitate determining a similarity.

Referring to FIG. 7 again, the processor can create a first confidence graph G1 by arranging the sample confidences $P_1$ of the pretrained neural network in order of magnitude and can create a second confidence graph G2 by arranging the sample confidences $P_u$ of the target neural network in order of magnitude.

The processor can recognize an epoch at which the similarity between the first and second confidence graphs G1 and G2 is the maximum by applying various methods that can determine similarity between graphs, and can early stop learning of the target neural network at the epoch.

Meanwhile, in order to match not only the tendency, but the numbers of data in the sample confidences $P_1$ and $P_u$, it is possible to sample the sample confidences $P_u$ on the unlabeled data by the number of the labeled data.

Referring to FIG. 8, the processor can sample the second confidence graph G2 such that the numbers of samples corresponding to the first and second confidence graphs G1 and G2 become the same. For example, the processor can obtain a sampled confidence $P_u$ s by sampling the sample confidences $P_u$ shown in the second confidence graph G2 by 100 points corresponding to the labeled data with regular intervals, and can create a sampling graph Gs on the basis of the sampled confidence.

Next, the processor can recognize an epoch at which the similarity ($S_{conf}$=sim($P_1$, $p_u^s$)) between the first confidence graph G1 and the sampling graph Gs is the maximum, and can early stop learning of the target neural network at the epoch.

Referring to FIG. 9, for example, the processor can calculate a similarity $S_{conf}$ between the first confidence graph and the sampling graph through 12 epochs. In this case, the similarity can be calculated by Euclidean distance. As shown in FIG. 9, the similarity between two graphs may have the maximum value (minimum Euclidean distance) at the sixth epoch, and the processor can early stop learning of the target neural network at the sixth epoch. That is, the processor can determine the parameters determined at the sixth epoch as the final parameters of the target neural network.

In another embodiment, the processor can early stop learning of a target neural network on the basis of the similarity between prediction class distributions of a pretrained neural network and the target neural network on unlabeled data. In this case, the prediction class distribution is class distribution predicted using the unlabeled data and may be determined as the average probabilities for each class over the unlabeled data.

In detail, the processor can input unlabeled data to the previously created pretrained neural network and the target neural network created for each epoch, and the pretrained neural network and the target neural network can output probabilities that unlabeled data belong to each class. In this case, the processor can determine the average probabilities for each class over the unlabeled data as a prediction class distribution.

For example, when a pretrained neural network and a target neural network are trained to perform an emotion classification task, the processor can input a text $x_u$ that is an unlabeled datum to the neural network, and the pretrained neural network and the target neural network can output the probabilities that $x_u$ belongs to each class as in the following [Table 2] and [Table 3], respectively.

TABLE 2

| | Class | |
|---|---|---|
| Input ($x_u$) | Positive | Negative |
| $x_{u1}$ | 0.94 | 0.06 |
| $x_{u2}$ | 0.43 | 0.57 |
| $x_{u3}$ | 0.76 | 0.24 |
| $x_{u4}$ | 0.27 | 0.73 |

TABLE 3

| | Class | |
|---|---|---|
| Input ($x_u$) | Positive | Negative |
| $x_{u1}$ | 0.93 | 0.07 |
| $x_{u2}$ | 0.23 | 0.77 |
| $x_{u3}$ | 0.90 | 0.10 |
| $x_{u4}$ | 0.26 | 0.74 |

In this case, the processor can determine the prediction class distribution of the pretrained neural network as (0.6, that is ((0.94+0.43+0.76+0.27)/4, (0.06+0.57+0.24+0.73)/4) and the prediction class distribution of the target neural network as (0.58, 0.42) that is ((0.93+0.23+0.90+0.26)/4, (0.07+0.77+0.10+0.74)/4).

The processor can early stop learning of the target neural network at the epoch at which the similarity between the prediction class distribution of the pretrained neural network and the prediction class distribution of the target neural network is the maximum. In an example, the processor can calculate a cosine similarity between the prediction class distributions of the pretrained neural network and the target neural network at every epoch of the target neural network, and can early stop learning of the target neural network at the epoch at which the cosine similarity is the maximum.

Meanwhile, the pretrained neural network is a neural network trained on the basis of a small amount of training dataset, so the accuracy of the neural network may be low in comparison to an ideal case and the prediction class distribution may also be inaccurate because it depends on the performance of the pretrained neural network. The processor can calibrate the prediction class distribution of the pretrained neural network to improve inaccuracy due to low performance of a neural network.

In detail, the processor can calibrate a prediction class distribution to be proportioned to the difference between the performance of the pretrained neural network and the ideal performance, and to this end, it may use linear proportion.

In detail, the processor can calibrate the prediction class distribution of the pretrained neural network on an unlabeled dataset on the basis of the prediction class distribution of the pretrained neural network on a validation dataset or an actual class distribution of a labeled dataset and the accuracy of the pretrained neural network on the validation dataset.

Referring to FIG. 10, when a neural network of the present disclosure performs a classification task with n c classes, the minimum accuracy (expected accuracy of random prediction) $Acc_{min}$ may be 1/n c and the maximum accuracy $Acc_{max}$ may be 1.

In this case, when the performance of a pretrained neural network on a validation dataset is $Acc_{val}$, the prediction class distribution on the validation dataset or the actual class distribution of a labeled dataset is B, and the prediction class distribution on an unlabeled dataset is $C_u$, the processor can estimate a prediction class distribution when the performance of the pretrained neural network is assumed to be ideal, $C_u'$, using linear proportion.

Referring to the example shown in FIG. 11, when the performance $Acc_{val}$ of a pretrained neural network on a validation dataset is 0.8, the prediction class distribution on the validation dataset or actual class distribution B of a labeled dataset is (0.5, 0.5), and the prediction class distribution on an unlabeled dataset C u is (0.65, 0.35), the processor can calculate the calibrated prediction class distribution $C_u'$ as (0.75, 0.25) in accordance with the following [Equation 1].

$$C_u' = B + \frac{(1 - 1/n_c)}{(Acc_{val} - 1/n_c)}(C_u - B) \quad \text{[Equation 1]}$$

(where $n_c$ is the number of classes)

The processor can early stop learning of the target neural network at the epoch at which the similarity between the calibrated prediction class distribution $C_u'$ of the pretrained neural network and the prediction class distribution of the target neural network that is output at each epoch is the maximum.

Meanwhile, the processor may perform an early stopping operation by applying both the early stopping method based on the sample confidence described in previous embodiments and the early stopping method based on a prediction class distribution.

In detail, the processor can early stop learning of a target neural network on the basis of a first similarity between the sample confidence of a pretrained neural network on a labeled dataset and the sample confidence of the target neural network on unlabeled data and a second similarity between prediction class distributions of the pretrained neural network and the target neural network on the unlabeled data.

There is no correlation that can be quantified and there is independent tendency between the first similarity and the second similarity, so the processor can early stop learning of the target neural network at an appropriate point in time while referring to both the first and second similarities.

Referring to FIG. 12 showing a graph showing measures according to epochs, a first similarity (e.g., Euclidian distance, Conf-sim) may represent tendency of following a test loss of a target neural network in a long period during epochs. However, a second similarity (e.g., cosine similarity, Class-sim) may represent tendency of following test accuracy of a target neural network in a short period during epochs.

In consideration of this, first, the processor specifies the epoch range in which it is estimated that a low loss would be represented on the basis of the first similarity, and determines an epoch at which it is estimated that the highest accuracy would be represented within the range on the basis of the second similarity, thereby being able to early stop learning of a target neural network.

In an example, the processor further trains the target neural network by preset epochs including the epoch having the maximum first similarity, and can early stop learning of the target neural network at the epoch having the maximum second similarity of preset epochs.

Referring to FIG. 12 again, the processor can recognize the sixth epoch as the epoch having the maximum first similarity (minimum Euclidian distance), and can calculate the second similarity at each epoch while further training the neural network by preset epochs e re f.

The second similarity calculated at each epoch has the maximum value at the eighth epoch, so the processor can determine the eighth epoch as an early stopping point in time and can early stop learning of the target neural network at the eighth epoch. That is, the processor can determine the parameters determined at the eighth epoch as the final parameters of the target neural network.

According to the present disclosure described above, it is possible to train a neural network using the entire labeled dataset without allocating a portion of the labeled dataset as a validation dataset, so it is possible to improve the performance of the neural network.

Further, according to the present disclosure, an ideal early stopping point in time of learning of a neural network is determined using a great amount of unlabeled data, so it is very useful for learning of a neural network particularly for tasks with a small amount of labeled dataset.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be prediction from the configuration should be also admitted.

What is claimed is:

1. An early stopping method for a neural network, comprising:

dividing a labeled dataset into a training dataset and a validation dataset;

creating a pretrained neural network by training a neural network using the training dataset and early stopping learning of the neural network using the validation dataset; and creating a target neural network for each epoch by training the target neural network using the entire labeled dataset, and early stopping learning of the target neural network on the basis of a similarity between output of the pretrained neural network on at least one of the labeled dataset and unlabeled dataset and output of the target neural network on the unlabeled dataset, wherein the early stopping includes early stopping learning of the target neural network on the basis of a similarity between a sample confidence of the pretrained neural network on the labeled dataset and a sample confidence of the target neural network on an unlabeled dataset.

2. The early stopping method of claim 1, wherein the early stopping includes early stopping learning of the target neural network at an epoch at which the similarity between the output of the pretrained neural network and the output of the target neural network is the maximum.

3. The early stopping method of claim 1, wherein the early stopping includes:

creating a first confidence graph by arranging sample confidences of the pretrained neural network in order of magnitude;

creating a second confidence graph by arranging sample confidences of the target neural network in order of magnitude; and early stopping learning of the target neural network on the basis of a similarity between the first and second confidence graphs.

4. The early stopping method of claim 3, wherein the early stopping includes:

sampling the second confidence graph such that the numbers of samples corresponding to the first and second confidence graphs become the same; and early stopping learning of the target neural network on the basis of a similarity between the first confidence graph and the sampled second confidence graph.

5. The early stopping method of claim 1, wherein the early stopping includes early stopping learning of the target neural network on the basis of a similarity between prediction class distributions of the pretrained neural network and the target neural network on unlabeled data.

6. The early stopping method of claim 5, wherein the early stopping includes:

calibrating the prediction class distribution of the pretrained neural network on the unlabeled data on the basis of the prediction class distribution of the pretrained neural network on the validation dataset or an actual class distribution of the labeled dataset and accuracy of the pretrained neural network on the validation dataset; and early stopping learning of the target neural network on the basis of the similarity between the calibrated prediction class distribution of the pretrained neural network and the prediction class distribution of the target neural network.

7. An early stopping method for a neural network, comprising:

dividing a labeled dataset into a training dataset and a validation dataset;

creating a pretrained neural network by training a neural network using the training dataset and early stopping learning of the neural network using the validation dataset; and creating a target neural network for each epoch by training the target neural network using the entire labeled dataset, and early stopping learning of the target neural network on the basis of a similarity between output of the pretrained neural network on at least one of the labeled dataset and unlabeled data and output of the target neural network on the unlabeled dataset, wherein the early stopping includes early stopping learning of the target neural network on the basis of a similarity between prediction class distributions of the pretrained neural network and the target neural network on unlabeled dataset, wherein the early stopping includes:

calibrating the prediction class distribution of the pretrained neural network on the unlabeled data on the basis of the prediction class distribution of the pretrained neural network on the validation dataset or an actual class distribution of the labeled dataset and accuracy of the pretrained neural network on the validation dataset; and early stopping learning of the target neural network on the basis of the similarity between the calibrated prediction class distribution of the pretrained neural network and the prediction class distribution of the target neural network, and wherein the calibrating includes calibrating the prediction class distribution of the pretrained neural network on the unlabeled data in accordance with the following [Equation 1], $$C'_u = B + \frac{(1 - 1/n_c)}{(Acc_{val} - 1/n_c)}(C_u - B) \quad \text{[Equation 1]}$$

(where $C_u'$ is a calibrated prediction class distribution, B is the prediction class distribution of the pretrained neural network on the validation dataset or the actual class distribution of the labeled dataset, $Acc_{val}$ is the accuracy of the pretrained neural network on the validation dataset, $n_c$ is the number of classes, and $C_u$ is the prediction class distribution of the pretrained neural network on the unlabeled data).

8. An early stopping method for a neural network, comprising:

dividing a labeled dataset into a training dataset and a validation dataset;

creating a pretrained neural network by training a neural network using the training dataset and early stopping learning of the neural network using the validation dataset; and creating a target neural network for each epoch by training the target neural network using the entire labeled dataset, and early stopping learning of the target neural network on the basis of a similarity between output of the pretrained neural network on at least one of the labeled dataset and unlabeled dataset and output of the target neural network on the unlabeled dataset, wherein the early stopping includes early stopping learning of the target neural network on the basis of a first similarity between a sample confidence of the pretrained neural network on the labeled dataset and a sample confidence of the target neural network on unlabeled data and a second similarity between prediction class distributions of the pretrained neural network and the target neural network on the unlabeled data.

9. The early stopping method of claim 8, wherein the early stopping includes further training the target neural network by preset epochs including an epoch at which the first similarity is the maximum, and early stopping learning of the target neural network at an epoch at which the second similarity is the maximum of the preset epochs.

* * * * *